United States Patent
Favero et al.

(10) Patent No.: US 11,505,634 B2
(45) Date of Patent: Nov. 22, 2022

(54) METHOD FOR PRODUCING ANIONIC WATER-SOLUBLE POLYMER ON THE BASIS OF BIOACRYLAMIDE AND ACRYLIC ACID

(71) Applicant: SPCM SA, Andrezieux Boutheon (FR)

(72) Inventors: Cédrick Favero, Andrezieux Boutheon (FR); Jun Gao, Taixing (CN); Jing Ling, Taixing (CN)

(73) Assignee: SPCM SA, Andrezieux Boutheon (FR)

( * ) Notice: Subject to any disclaimer, the term of this patent is extended or adjusted under 35 U.S.C. 154(b) by 133 days.

(21) Appl. No.: 16/770,251

(22) PCT Filed: Dec. 19, 2017

(86) PCT No.: PCT/CN2017/117057
§ 371 (c)(1),
(2) Date: Jun. 5, 2020

(87) PCT Pub. No.: WO2019/119248
PCT Pub. Date: Jun. 27, 2019

(65) Prior Publication Data
US 2021/0171684 A1    Jun. 10, 2021

(51) Int. Cl.
*C08F 220/56* (2006.01)
*C08F 2/10* (2006.01)
*C08F 6/02* (2006.01)

(52) U.S. Cl.
CPC .............. *C08F 220/56* (2013.01); *C08F 2/10* (2013.01); *C08F 6/02* (2013.01)

(58) Field of Classification Search
CPC .............. C08F 220/56; C08F 2/10; C08F 6/02
See application file for complete search history.

(56) References Cited

U.S. PATENT DOCUMENTS

2007/0208143 A1    9/2007  Kimura et al.

FOREIGN PATENT DOCUMENTS

| CN | 102344532 A | 2/2012 | |
|---|---|---|---|
| CN | 102703535 A | 10/2012 | |
| CN | 102850487 A | 1/2013 | |
| CN | 105199036 A | 12/2015 | |
| WO | WO-2017186698 A1 * | 11/2017 | ............. B01D 21/01 |

OTHER PUBLICATIONS

International Search Report (and English translation) and Written Opinion of the International Searching Authority for International Patent Application No. PCT/CN2017/117057 dated Jul. 20, 2018.

* cited by examiner

*Primary Examiner* — Catherine S Branch
(74) *Attorney, Agent, or Firm* — Heslin Rothenberg Farley & Mesiti P.C.

(57) ABSTRACT

Process for the production of anionic water-soluble polymer obtained by the polymerization of acrylic acid and acrylamide obtained by biocatalysed reaction, said process comprising the steps of preparing a diluted solution of acrylic acid by mixing acrylic acid and water wherein the mass ratio between acrylic acid and water is comprised between 95:5 and 70:30, preparing a diluted solution of bioacrylamide and water wherein the mass ratio between bioacrylamide and water is comprised between 60:40 and 10:90, mixing said diluted solution of acrylic acid with said diluted solution of bioacrylamide, neutralizing partially or totally the acid function of acrylic acid and polymerizing the resulting mixture.

19 Claims, No Drawings

METHOD FOR PRODUCING ANIONIC WATER-SOLUBLE POLYMER ON THE BASIS OF BIOACRYLAMIDE AND ACRYLIC ACID

CROSS REFERENCE TO RELATED APPLICATIONS

This application is a national stage filing under section 371 of International Application No. PCT/CN2017/117057 filed on Dec. 19, 2017, and published on Jun. 27, 2019 as WO 2019/119248. The entire contents of WO 2019/119248 are hereby incorporated herein by reference.

TECHNICAL FIELD OF THE INVENTION

The invention relates to a process for the production of anionic water-soluble polymer based on acrylamide obtained by biocatalysed reaction and acrylic acid.

BACKGROUND OF THE INVENTION

Acrylamide has been obtained firstly with the sulphuric acid hydrolysis process in which acrylonitrile is heated in presence of sulphuric acid and water. This process has been replaced by a copper catalyst process in which acrylamide is obtained by direct hydration of acrylonitrile in presence of copper catalyst such as copper metal, reduced copper but this catalyst process cause side reactions because of the harsh conditions.

Biocatalysed process has been developed in which a microbial nitrile hydration enzyme is used for the production of high purity acrylamide. Said high purity acrylamideis commonly called bioacrylamide.

Acrylamide is widely used as starting material to produce water soluble polymers which can be used as a flocculating agent in water treatment, sludge dewatering or papermaking process for example, or as thickener in oil recovery process or in cosmetic compositions for example.

Acrylic acid is also a very common monomer used in combination with acrylamide to produce anionic water-soluble polymer.

Despite great improvement of the anionic water-soluble polymer based on acrylamide and acrylic acid, there is still a need to improve the solubility and the performances of these polymers.

SUMMARY OF THE INVENTION

It has been surprisingly found that these goals are reached by diluting acrylic acid with water in a specific ratio before mixing it with diluted bioacrylamide.

In the present invention, the terms "bioacrylamide" is used in place of the terms acrylamide obtained by biocatalysed reaction.

The present invention provides a process for the production of anionic water-soluble polymer obtained by the polymerization of acrylic acid and bioacrylamide, said process comprising the steps of:
  Preparing a diluted solution of acrylic acid by mixing acrylic acid and water wherein the mass ratio between acrylic acid and water is comprised between 95:5 and 70:30;
  Preparing a diluted solution of bioacrylamide and water wherein the mass ratio between bioacrylamide and water is comprised between 60:40 and 10:90;
  Mixing said diluted solution of acrylic acid with said diluted solution of bioacrylamide;
  Neutralizing partially or totally the acid function of acrylic acid;
  Polymerizing the resulting mixture.

It has been found that when bioacrylamide is mixed with acrylic acid, oligomers are formed. The most common oligomers are dimers and trimers of acrylic acid. These oligomers are detrimental to the quality of the polymer made with bioacrylamide and acrylic acid. Oligomeric species may be formed by Michael addition or free radical reaction or ionic polymerization.

It has been surprisingly found that when acrylic acid is diluted with water such that a mass ratio of the acrylic acid and water comprised between 95:5 and 70:30, and when bioacrylamide is diluted with water such that a mass ratio of the bioacrylamide and water comprised between 60:40 and 10:90, before mixing them, the amount of oligomers is dramatically reduced, then allowing the production of anionic water-soluble polymer having an improved solubility and better performances.

The neutralization step is preferably made such that at least 40% of acrylic acid functions are neutralized, more preferably at least 50%. Acrylic acid function may be fully neutralized, and additional base may be added to have an excess of up to 10% based on the theoretical feeding amount of base added to fully neutralize acrylic acid function. Any kind of base may be used to neutralize acrylic acid function. NaOH, KOH and NH4OH are preferred.

The water used is preferably distilled or purified water.

In a preferred embodiment, the aqueous solution of bioacrylamide does not contain acrylamide not obtained by biocatalyzed reaction. Said solution preferably contains bioacrylamide, water and up to 1% by weight of stabilizing agent.

In a preferred embodiment, the aqueous solution of bioacrylamide, that is mixed with the diluted solution of acrylic acid, comprises 15 to 45% by weight of bioacrylamide.

According to the invention, the mass ratio between acrylic acid and water in the diluted solution of acrylic acid, before this solution is mixed with the aqueous solution of bioacrylamide, is preferably comprised between 93:7 and 80:20, preferably comprised between 92:8 and 85:15. A very preferred ratio is 90:10.

According to the invention, the mass ratio between bioacryamide and water in the diluted solution of bioacrylamide, before this solution is mixed with the diluted solution of acrylic acid, is preferably comprised between 60:40 and 20:80, preferably comprised between 60:40 and 30:70. A very preferred ratio is comprised between 55:45 and 45:55.

The molar ratio of acrylic acid and its salts in the monomer mixture before polymerization is preferably comprised between 5 mol % and 95 mol % based on the total molars of monomers in the monomer mixture before polymerization, more preferably comprised between 10 mol % and 70 mol %, even more preferably comprised between 20 mol % and 50 mol %.

The molar ratio of bioacrylamide in the monomer mixture before polymerization is preferably comprised between 5 mol % and 95 mol % based on the total molars of monomers in the monomer mixture before polymerization, more preferably comprised between 30 mol % and 90 mol %, even more preferably comprised between 50 mol % and 80 mol %.

The molar ratio of a monomer corresponds to the molar number of said monomer to the total number of moles of monomers in the monomer mixture multiply by 100%.

According to the invention, the way the monomer mixture is polymerized is not limited to a particular polymerization type. The polymerization techniques known to the person skilled in the art may be used such as solution polymerization, gel polymerization, inverse emulsion polymerization, which may or may not be followed by a spray drying step, or which may or may not be followed by post-hydrolysis or co-hydrolysis polymerization.

In the process of the invention, all of these polymerization techniques allow the production of high quality polymer but according to the invention gel polymerization is preferred because it gives higher performances. The gel is then cut, grinded and dried to obtain a powder.

The polymerization is generally a free radical polymerization. By free radical polymerization, we include free radical polymerization by means of U.V. azoic, redox or thermal initiators and also Controlled Radical Polymerization (CRP) techniques or template polymerization techniques.

In the process of the invention, other monomers may be used in combination with bioacrylamide and acrylic acid. These monomers may be selected in the following list:

Non ionic monomers: methacrylamide, N,N-dimethylacrylamide, N-vinylpyrrolidone, N-vinylformamide, the methacrylates of polyethylene glycol, diacetoneacrylamide, N-isopropylacrylamide, 2-hydroxyethyl acrylate, 2,3-dihydroxypropyl acrylate, 2-hydroxyethyl methacrylate, 2,3-dihydroxypropyl methacrylate, Anionic monomers: 2-acrylamido-2-methylpropane sulfonic acid (ATBS), methacrylic acid, itaconic acid, maleic acid, non-salified, partially or completely salified, Cationic monomers: diallyldimethylammonium chloride (DADMAC), dialkylaminoethyl acrylate (DAMEA) and dialkylaminoethyl methacrylate (DAMEMA), acrylamido dialkylaminopropyl, methacrylamido dialkylaminopropyl, and their acidified or quaternized salts.

A structure agent may also be used, for example polyethylenically unsaturated monomers (having at least two unsaturated functional groups), such as, for example, vinyl, allyl, acrylic and epoxy functional groups, and there may be mentioned, for example, methylenebisacrylamide (MBA), triallylamine, or by macroinitiators such as the polyperoxides, polyazo compounds and transfer polyagents such as polymercaptan polymers.

When a structure agent is used, its amount is such that the polymer obtained by the process of the invention is still water-soluble.

The present invention also provides a anionic water-soluble polymer, made with acrylamide obtained by biocatalysed reaction and acrylic acid, and obtained by the process of the invention.

The polymer according to the invention has preferably an average molecular weight by weight comprised between 1.5 and 30 millions g/mol. The average molecular weight by weight is measured by Gel Permeation Chromatography (GPC).

Same other conditions being equal, the polymer according to the invention obtained by the process of the invention has a better solubility compare to a polymer obtained by another process.

The solubility is measured by mixing the polymer in powder form in distilled water at a concentration of 3 g/l during 30 minutes at 25° C., and by doing a Filter Ratio (FR) Test with the resulted mixture. The Filter Ratio Test is well known and used in the Oil & Gas industry. The lower the FR value is, better is the solubility. A Filter Ratio value from 1 to 1.5 characterizes a good solubility.

The "filter ratio" (FR) according to the present invention is determined by a test as described herein which involves injecting an aqueous polymer solution through a filter at a constant pressure. The FR is determined by the measured difference between time at 300 mL minus time at 200 mL, divided by difference between time at 200 mL minus time at 100 mL.

Filter Ratio Test is the following. A solution of polymer (3 g/l) obtained as described previously is filtered through a 5 μm nucleopore membrane under constant pressure of 2 bars. The membrane or filter (Whatman Nuclepor, 47 mm diameter, polycarbonate type, thickness 7 to 22 μm) is inserted in a Sartorius SM16249 filtration set-up (bottom part). Time versus filtrated volume is recorded. FR corresponds to the difference between time at 300 Ml of the filtrated volume minus time at 200 mL of the filtrated volume, divided by difference between time at 200 mL of the filtrated volume minus time at 100 mL of the filtrated volume:

$$FR = \frac{t_{300\,ml} - t_{200\,ml}}{t_{200\,ml} - t_{100\,ml}}$$

wherein t300 ml=time needed for obtaining 300 ml filtrate at constant pressure t200 ml=time needed for obtaining 200 ml filtrate at constant pressure t100 ml=time needed for obtaining 100 ml filtrate at constant pressure Time accuracy is 0.1 sec.

The polymer according to the invention shows also better performances for example in terms of flocculation. Without being limited to any theory, it seems that the polymer according to the invention has a better anionic charge distribution along the polymer chain due to the reduced amount of oligomeric species and improved control over of the polydispersity of the polymer, that allows a more homogenous action and a better performance.

The present invention also provides the use of the polymer of the invention in water treatment, sludge dewatering, papermaking process, agriculture, cosmetic and detergency composition, textile process, oil and gas recovery process, mining operation.

SPECIFIC EMBODIMENTS

The present invention will now be illustrated in greater details by way of following examples.

EXAMPLES

Polymers of the examples are made with 75 mol % of an acrylamide based on the total numbers of moles of monomers, and 25 mol % of acrylic acid based on the total number of moles of monomers. Acrylic acid is diluted with distilled water at different mass ratio as described in table 1. Bioacrylamide is diluted as necessary prior to being mixed with diluted acrylic acid. Diluted acrylic acid and diluted bioacrylamide are mixed. Then acrylic acid is completely neutralized with NaOH under colling to keep the temperature between 0° C. and 5° C.

The solution is cooled to 0° C. and transferred to an adiabatic vessel (Dewar). A temperature probe is introduced in the adiabatic vessel (Dewar) in order to record temperature increase during polymerization. The solution is sparged with nitrogen during 30 minutes. The initiators are introduced in the solution. The choice of initiator is adapted to pH of the solution as well as the type of monomers to be polymerized. In this example, 5 ppm of Sodium persulfate and 5 ppm of sodium sulfite are added to initiate the polymerization.

After 5 minutes, viscosity increases in the adiabatic vessel (Dewar), nitrogen sparging is stopped. Temperature rises to 90° C. and polymerization is aged during 3 hours to obtain gel. The gel obtained is cut, granulated using a granulator with grids to obtain gel particles with a diameter below 6 mm. These gel particles are dried in an oven at 50° C. overnight. The dry powder obtained is grinded and sieved to obtain a white powder with particle diameters below 1 mm of diameter.

Polymers obtained have a weight average molecular weight of about 10 to 15 millions g/mol.

Solubility Test is made with Filter Ratio as described previously. Results are summarized in Table 1.

Flocculation Test

Polymer solutions are made by mixing the polymer in powder form in distilled water at a concentration of 5 g/l during 30 minutes at 25° C. Flocculation Test are made by mixing resulting solutions with a red mud having a solid content of 15% by weight. The dosage is 500 g/dry ton which correspond to the amount of polymer in dry form to the solid content of red mud. This unity is widely used in the mining industry. The results are expressed in terms of Net Water Release (ml) after 24 hours. For each test, the appropriate volume of polymer solution was added into 200 g of red mud and then the whole mixture was mixed manually until flocculation and water release were observed, and then let they stand until 24 hours to obtain the Net Water Release (ml).

Table 1 summarizes the results of Solubility Test and Flocculation Test.

| Example | Type | Acrylic Acid/Water Mass Ratio | Bio-acrylamide/ Water Mass Ratio | Filter Ratio Value | Focculation Test/Net Water Release after 24 h. (ml) |
|---|---|---|---|---|---|
| 1 | CE | 100:0 | 50:50 | 2.7 | 11.2 |
| 2 | CE | 97:3 | 50:50 | 1.9 | 12.9 |
| 3 | E | 93:7 | 50:50 | 1.5 | 14.1 |
| 4 | E | 90:10 | 50:50 | 1.15 | 15.6 |
| 5 | E | 75:25 | 50:50 | 1.40 | 14.2 |
| 6 | CE | 60:40 | 50:50 | 2.1 | 12.9 |
| 7 | CE | 100:0 | 20:80 | 1.9 | 12.8 |
| 8 | E | 90:10 | 20:80 | 1.05 | 16.5 |
| 9 | CE | 60:40 | 20:80 | 2.2 | 11.8 |

Water release correspond to the total amount of water released. Net Water Release (NWR) corresponds to the total amount of water (in ml) recovered during the flocculation test minus the amount of the water coming from the polymer solution used to flocculate the red mud.

CE means Counter Example.

E means Example according to the invention.

According to the data presented in table 1, the FR is significantly lower when the polymer is made according to the process of the invention. Polymers of examples 3, 4, 5 and 8 have a FR value comprised between 1 and 1.5 which means that their solubility is very good, and better compared to the solubility of counter-examples 1, 2, 6, 7 and 9 for which the FR value is higher than 1.5 and comprised between 1.9 and 2.7.

The results clearly show that the process according to the invention leads to a significant improvement of the solubility.

According to the data presented in table 1, the Net Water Release is higher with the polymers obtained with the process of the invention. Examples 3, 4, 5 and 8 have a NWR higher than 14 ml and comprised between 14.1 ml and 16.5 ml. In contrast the polymers of counter-examples 1, 2, 6, 7 and 9 have a NWR lower than 13 and comprised between 11.2 ml and 12.9 ml.

The results clearly show that the process according to the invention leads to a significant improvement of the flocculation.

The following test are made to compare polymers made with bioacrylamide to polymers made with acrylamide obtained by Copper catalyst. Polymers of examples 10, 11 and 12 are made exactly with the same ingredients and process respectively as examples 3, 4 and 5 except that in examples 10, 11 and 12, bioacrylamide is replace by acrylamide obtained by a Copper Catalyst reaction. The same tests as previously described are made and the following results are obtained and summarized in Table 2 below.

Table 2 summarizes the results of Solubility Test and Flocculation Test for the polymer prepared by using different acrylamide.

| Example | Type | Acrylic Acid/Water Mass Ratio | Acrylamide/ Water Mass Ratio | Filter Ratio Value | Focculation Test/ Net Water Release after 24 h. (ml) |
|---|---|---|---|---|---|
| 3 | E | 93:7 | 50:50 | 1.5 | 14.1 |
| 4 | E | 90:10 | 50:50 | 1.15 | 15.6 |
| 5 | E | 75:25 | 50:50 | 1.40 | 14.2 |
| 10 | CE | 93:7 | 50:50* | 1.78 | 12.2 |
| 11 | CE | 90:10 | 50:50* | 1.70 | 12.8 |
| 12 | CE | 75:25 | 50:50* | 1.75 | 12.6 |

*Acrylamide obtained by a Copper Catalyst reaction

The results demonstrate that the polymers made according to the invention with bioacrylamide give better performances compare to polymers made with acrylamide obtained by a Copper Catalyst reaction.

The following test are made to compare polymers made with bioacrylamide solution having a mass ratio of 50:50 according to the invention to polymers made with bioacrylamide solution having a mass ratio of 80:20. Polymers of examples 13, 14 and 15 are made exactly with the same ingredients and process respectively as examples 3, 4 and 5 except that in examples 13, 14 and 15, bioacrylamide solution having a mass ratio of 50:50 according to the invention is replace by bioacrylamide solution having a mass ratio of 80:20. The same tests as previously described are made and the following results are obtained and summarized in Table 3 below.

Table 3 summarizes the results of Solubility Test and Flocculation Test for the polymer prepared by using bioacrylamide having different concentrations.

| Example | Type | Acrylic Acid/Water Mass Ratio | Bioacrylamide/ Water Mass Ratio | Filter Ratio Value | Focculation Test/ Net Water Release after 24 h. (ml) |
|---|---|---|---|---|---|
| 3 | E | 93:7 | 50:50 | 1.5 | 14.1 |
| 4 | E | 90:10 | 50:50 | 1.15 | 15.6 |
| 5 | E | 75:25 | 50:50 | 1.40 | 14.2 |
| 13 | CE | 93:7 | 80:20 | 2.3 | 11.9 |
| 14 | CE | 90:10 | 80:20 | 2.1 | 12.6 |
| 15 | CE | 75:25 | 80:20 | 2.2 | 12.1 |

The results demonstrate that the polymers made according to the invention give better performances compare to polymers made bioacrylamide solution having a mass ratio of 80:20.

The invention claimed is:

1. A process for the production of anionic water-soluble polymer obtained by the polymerization of acrylic acid and bioacrylamide, said process comprising the steps of:
    preparing a diluted solution of acrylic acid by mixing acrylic acid and water wherein the mass ratio between acrylic acid and water is between 95:5 and 70:30;
    preparing a diluted solution of acrylamide obtained by biocatalysed reaction called bioacrylamide and water, wherein the mass ratio between bioacrylamide and water is between 60:40 and 10:90;
    mixing said diluted solution of acrylic acid with said diluted solution of bioacrylamide;
    neutralizing partially or totally the acid function of acrylic acid; and
    polymerizing the resulting mixture.

2. The process according to claim 1 wherein the mass ratio between acrylic acid and water is between 93:7 and 80:20.

3. The process according to claim 1 wherein the mass ratio between bioacryamide and water in the diluted solution of bioacrylamide, before this solution is mixed with the diluted solution of acrylic acid, is between 60:40 and 20:80.

4. The process according to claim 1 wherein during said neutralizing at least 40% of acrylic acid functions are neutralized.

5. The process according to claim 1 wherein acrylic acid functions are fully neutralized.

6. The process according to claim 1 wherein the water is distilled or purified water.

7. The process according to claim 1 wherein the molar ratio of acrylic acid in the monomer mixture before polymerization is between 5 mol % and 95 mol %, based on the total moles of monomers in the monomer mixture before polymerization.

8. The process according to claim 1 wherein the molar ratio of acrylamide obtained by the biocatalysed reaction in the monomer mixture before polymerization is between 5 mol % and 95 mol %, based on the total moles of monomers in the monomer mixture before polymerization.

9. The process according to claim 1 wherein said polymerizing the resulting mixture comprises gel polymerization.

10. The process according to claim 1 wherein the polymer comprises units from other monomers in addition to the bioacrylamide obtained by the biocatalysed reaction and acrylic acid, said monomers being selected from the following list:
    non ionic monomers: methacrylamide, N,N-dimethylacrylamide, N-vinylpyrrolidone, N-vinylformamide, the methacrylates of polyethylene glycol, diacetoneacrylamide, N-isopropylacrylamide, 2-hydroxyethyl acrylate, 2,3-dihydroxypropyl acrylate, 2-hydroxyethyl methacrylate, 2,3-dihydroxypropyl methacrylate,
    - anionic monomers: 2-acrylamido-2-methylpropane sulfonic acid (ATBS), methacrylic acid, itaconic acid, maleic acid, non-salified, partially or completely salified,
    - cationic monomers: diallyldimethylammonium chloride (DADMAC), dialkylaminoethyl acrylate (DAMEA) and dialkylaminoethyl methacrylate (DAMEMA), acrylamido dialkylaminopropyl, methacrylamido dialkylaminopropyl, and their acidified or quaternized salts.

11. The process according to claim 1 wherein the mass ratio between acrylic acid and water is between 92:8 and 85:15.

12. The process according to claim 1 wherein the mass ratio between bioacryamide and water in the diluted solution of bioacrylamide, before this solution is mixed with the diluted solution of acrylic acid, is between 60:40 and 30:70.

13. The process according to claim 1 wherein the mass ratio between bioacryamide and water in the diluted solution of bioacrylamide, before this solution is mixed with the diluted solution of acrylic acid, is between 55:45 and 45:55.

14. The process according to claim 11 wherein the mass ratio between bioacryamide and water in the diluted solution of bioacrylamide, before this solution is mixed with the diluted solution of acrylic acid, is between 60:40 and 30:70.

15. The process according to claim 1 wherein the molar ratio of acrylic acid in the monomer mixture before polymerization is between 20 mol % and 50 mol %, based on the total moles of monomers in the monomer mixture before polymerization.

16. The process according to claim 14 wherein the molar ratio of acrylic acid in the monomer mixture before polymerization is between 20 mol % and 50 mol %, based on the total moles of monomers in the monomer mixture before polymerization.

17. The process according to claim 1 wherein the molar ratio of acrylamide obtained by the biocatalysed reaction in the monomer mixture before polymerization is between 50 mol % and 80 mol %, based on the total moles of monomers in the monomer mixture before polymerization.

18. The process according to claim 16 wherein the molar ratio of acrylamide obtained by the biocatalysed reaction in the monomer mixture before polymerization is between 50 mol % and 80 mol %, based on the total moles of monomers in the monomer mixture before polymerization.

19. The process according to claim 18 wherein the polymer comprises units from other monomers in addition to the bioacrylamide obtained by the biocatalysed reaction and acrylic acid, said monomers being selected from the following list:
    - non ionic monomers: methacrylamide, N,N-dimethylacrylamide, N-vinylpyrrolidone, N-vinylformamide, the methacrylates of polyethylene glycol, diacetoneacrylamide, N-isopropylacrylamide, 2-hydroxyethyl acrylate, 2,3-dihydroxypropyl acrylate, 2-hydroxyethyl methacrylate, 2,3-dihydroxypropyl methacrylate,
    - anionic monomers: 2-acrylamido-2-methylpropane sulfonic acid (ATBS), methacrylic acid, itaconic acid, maleic acid, non-salified, partially or completely salified,

- cationic monomers: diallyldimethylammonium chloride (DADMAC), dialkylaminoethyl acrylate (DAMEA) and dialkylaminoethyl methacrylate (DAMEMA), acrylamido dialkylaminopropyl, methacrylamido dialkylaminopropyl, and their acidified or quaternized salts.

\* \* \* \* \*